March 29, 1938.   L. G. COPEMAN   2,112,452
CONCRETE OR CEMENT STRUCTURE
Filed Sept. 15, 1932
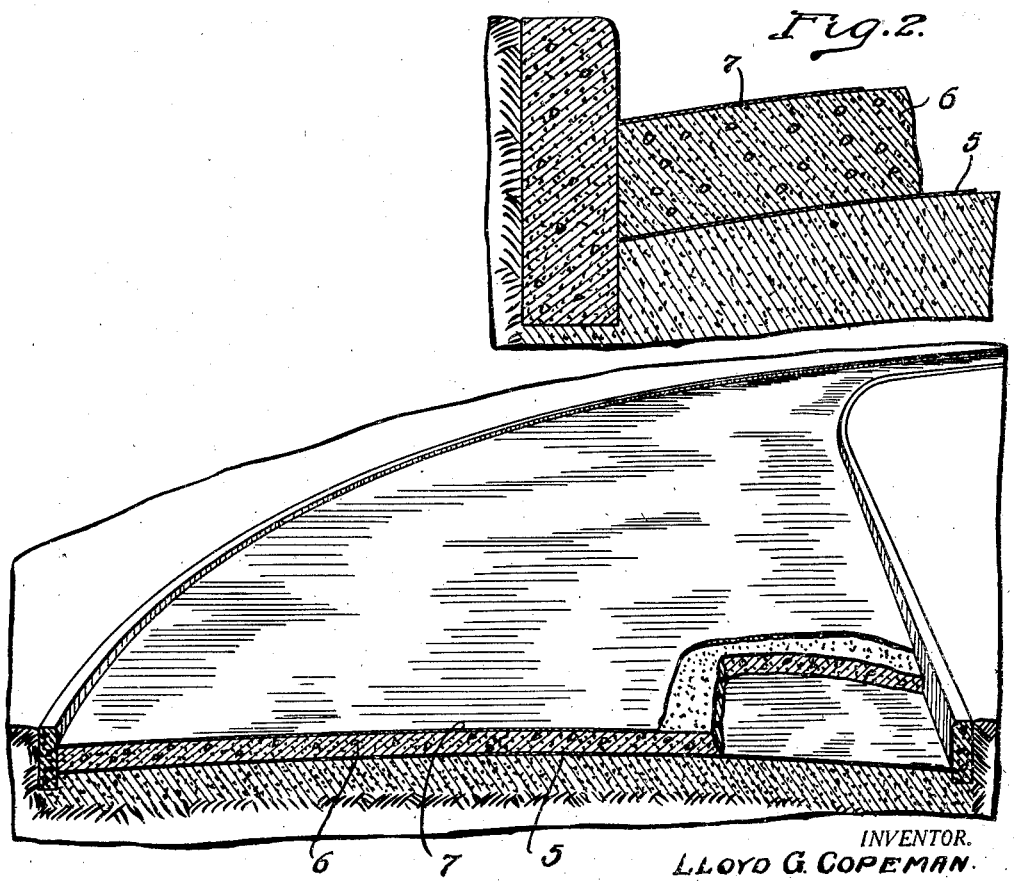
INVENTOR.
LLOYD G. COPEMAN
BY
Barnes, Kisselle & Laughlin
ATTORNEYS

UNITED STATES PATENT OFFICE 2,112,452

CONCRETE OR CEMENT STRUCTURE

Lloyd G. Copeman, Flint, Mich., assignor to Copeman Laboratories Company, Flint, Mich., a corporation of Michigan Application September 15, 1932, Serial No. 633,325

3 Claims. (Cl. 25—154)

This invention relates to concrete or cement structures. It has for its object the use either temporarily or permanently with such structures of an elastic impermeable protective coating, preferably of latex.

It has been found that the quick drying of concrete or cement work is usually deleterious. Lately it is quite the thing to see newly laid concrete roads being periodically wetted to keep the concrete moist during the curing operation.

My invention is equally applicable to roads in which asphaltum or tar is used for I find that the latex can be spread over the tar or asphaltum to good advantage especially where tar or other bituminous products are used that are near the liquefying point during hot weather. It is a source of great annoyance to motorists to get on roads where tar or other similar product has become somewhat fluid. It results in the objectionable tar being thrown all over the car and it is very hard to remove.

Referring to the drawing:

Fig. 1 is a perspective of a pavement of concrete or asphalt, tar or any other similar material.

Fig. 2 is an enlarged fragmentary cross section of the same.

On road constructions, or other cement, or concrete or asphaltum materials, I find it advantageous to first coat the road bed as shown in Fig. 2 with a coating of latex designated 5. The supporting surface itself may be concrete or asphaltum or any variation of these. This supporting surface is designated 6 and may be applied in a plastic state directly to the layer of rubber deposited from latex. A layer 7 of latex deposited rubber may be spread over the surface of the road immediately after it is made. This latex if the under surface is concrete, need only be a temporary one to protect the concrete during curing which is often several weeks; and even when the road is put into use the layer of rubber will stand up for a considerable period of time. It is quite common in up-to-date engineering to spray the concrete frequently during the curing operation, or to cover the same with dirt or straw before traffic is allowed on the road. This requires the erection of a lot of pipes, etc., to do this. A thin layer of latex can be spread over the surface, and over the road bed if desired, at a relatively low cost and will do the work much better because the moisture is kept in continuously and nothing is permitted to escape during the curing.

If the road is a road that has soft tar or asphaltum in its set-up or even if it be concrete with tar or other soft products on it, the whole or those portions in which the soft tar products are used, can be covered with a layer of latex and ground rubber. This will prevent the soft tar or similar products being thrown by the automobile tires when passing over the road.

What I claim is:

1. The method of retarding the setting up and curing of artificial stone articles including concrete roads and the like, which comprises depositing a layer of rubber from an aqueous dispersion of rubber, plastically applying and building up a layer of artificial stone over said layer of rubber, and then applying a thin layer of an aqueous dispersion of rubber to the surface of said artificial stone and allowing the same to set up into a homogeneous sheet of rubber to substantially but temporarily seal said artificial stone and allow the same to cure.

2. The method of retarding the setting up and curing of artificial stone articles including concrete roads and the like, which comprises depositing on a road-bed a layer of rubber from an aqueous dispersion of rubber, providing a rigid base of plastic stone material or the like on said layer and while still plastic applying a relatively thin layer of an aqueous dispersion of rubber directly to the surface of said plastic base, and allowing said dispersion to set up into a relatively thin homogeneous sheet of rubber to temporarily seal the base from the atmosphere during curing.

3. The method of protecting freshly poured concrete paving while it is curing which consists in directly applying to the road-bed and to the dense relatively smooth surface of the pavement a relatively thin coating of an aqueous dispersion of rubber, and allowing the dispersion to set up into a relatively thin homogeneous temporary coating.

LLOYD G. COPEMAN.